US009017046B2

(12) United States Patent
Owusu

(10) Patent No.: US 9,017,046 B2
(45) Date of Patent: Apr. 28, 2015

(54) FAN ASSEMBLY HAVING MULTIPLE CENTRIFUGAL FANS IN MECHANICAL CONNECTION WITH A PLANETARY GEAR SYSTEM

(71) Applicant: Elijah Anim Owusu, Woodmere, NY (US)

(72) Inventor: Elijah Anim Owusu, Woodmere, NY (US)

( * ) Notice: Subject to any disclaimer, the term of this patent is extended or adjusted under 35 U.S.C. 154(b) by 334 days.

(21) Appl. No.: 13/732,585

(22) Filed: Jan. 2, 2013

(65) Prior Publication Data

US 2014/0186197 A1    Jul. 3, 2014

(51) Int. Cl.
*F04B 35/04*    (2006.01)
*F04D 27/00*    (2006.01)
*F04D 25/06*    (2006.01)
*F04D 17/04*    (2006.01)
*F04D 25/02*    (2006.01)
*F04D 25/10*    (2006.01)
*F04D 25/16*    (2006.01)

(52) U.S. Cl.
CPC .......... *F04D 27/004* (2013.01); *F04D 25/0693* (2013.01); *F04D 17/04* (2013.01); *F04D 25/028* (2013.01); *F04D 25/10* (2013.01); *F04D 25/166* (2013.01)

(58) Field of Classification Search
CPC ..... F04D 27/004; F04D 17/04; F04D 25/028; F04D 25/166; F04D 25/10; F04D 25/0693

USPC .......... 417/423.5, 326, 423.6; 415/53.1–53.3, 415/60, 122.1
See application file for complete search history.

(56) References Cited

U.S. PATENT DOCUMENTS

| 990,222 | A | * | 4/1911 | Brown | 60/39.15 |
|---|---|---|---|---|---|
| 1,190,622 | A | * | 7/1916 | Bashor | 415/60 |
| 1,814,243 | A | | 7/1931 | Chryst | |
| 3,017,848 | A | * | 1/1962 | Bishop | 440/38 |
| 4,025,224 | A | * | 5/1977 | Starbard | 415/60 |
| 4,414,861 | A | * | 11/1983 | Witt | 74/606 A |
| 4,606,697 | A | * | 8/1986 | Appel | 415/4.4 |
| 5,382,132 | A | * | 1/1995 | Mendel | 415/60 |
| 7,118,323 | B2 | * | 10/2006 | Iyer et al. | 415/53.1 |
| 8,167,542 | B1 | * | 5/2012 | Owusu | 415/127 |
| 2005/0239367 | A1 | | 10/2005 | Fernandez, Jr. | |

* cited by examiner

*Primary Examiner* — Charles Freay
(74) *Attorney, Agent, or Firm* — Kyle A. Fletcher, Esq.

(57) ABSTRACT

The fan assembly having multiple centrifugal fans in mechanical connection with a planetary gear system is a novel improvement to the field of fans, and which includes at least two centrifugal fans that are in mechanical connection with a single drive source. A planetary gear system connects the centrifugal fans to the single drive source such that all centrifugal fans work in concert. The assembly includes a housing that is constructed of a first portion positioned atop and able to rotate with respect to a second portion. The ability of the first portion to rotate with respect to the second portion enables the first portion where the centrifugal fans to rotate 360 degrees. The first portion includes partitions, which isolate each centrifugal fans from one another.

20 Claims, 4 Drawing Sheets

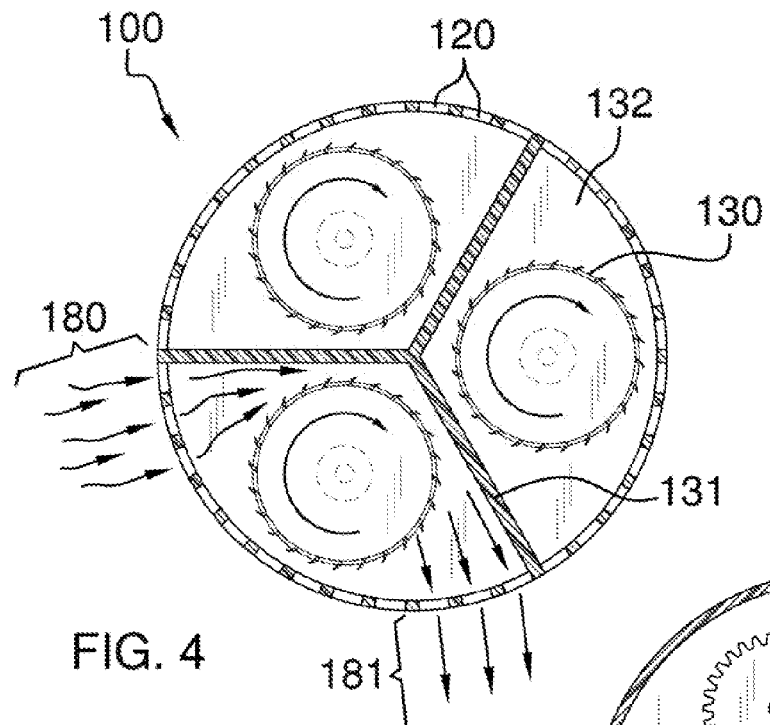
FIG. 4
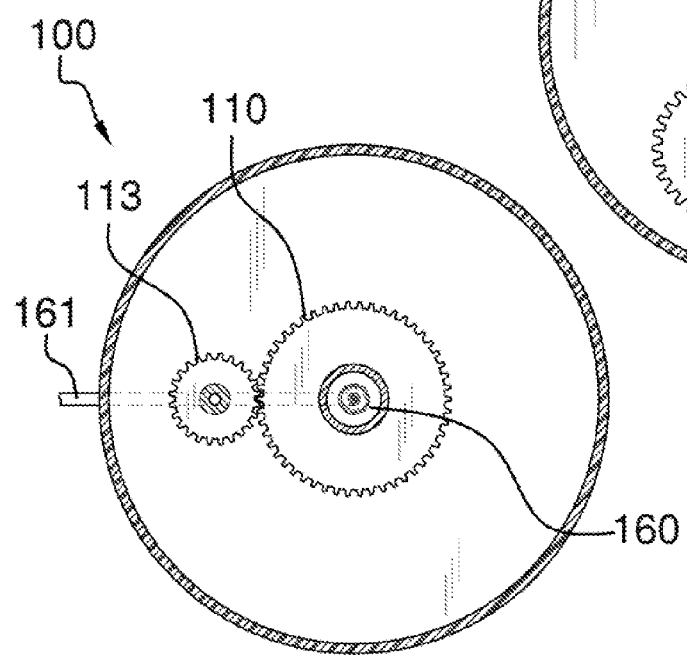
FIG. 5
FIG. 6

FAN ASSEMBLY HAVING MULTIPLE CENTRIFUGAL FANS IN MECHANICAL CONNECTION WITH A PLANETARY GEAR SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of air fans, more specifically, an assembly of centrifugal fans that are in mechanical connection with a single drive gear via a planetary gear system, and which communicate 360 degrees of air flow.

B. Discussion of the Prior Art

As will be discussed immediately below, no prior art discloses a fan assembly that includes at least two centrifugal fans that are collectively driven via a planetary gear system in connection with a single motor; wherein each centrifugal fan is partitioned within a respective portion of a housing, and which draws in air from one side of the portion of the housing and expelling air from an opposing side of the portion of the housing.

The Fernandez, Jr. Patent Application Publication (U.S. Pub. No. 2005/0239367) discloses a combined portable fan-candy holder toy. On FIGS. 10 and 11, the candy toy includes multiple fans that are driven via planetary gears. However, the fans do not use centrifugal fans or impellers that work radially, and also do not include partitions inside of a housing.

The Schiel Patent (U.S. Pat. No. 8,167,544) discloses a rotating device to be used in a fluid in order to generate power from the moving stream of fluid in order to generate power there from. However, the rotating device does not use a single motor to drive a planetary sun gear that communicates rotational movement to a plurality of centrifugal fans that are individually partitioned within a fan housing. Moreover, the rotating device of Schiel produces energy, and is not an air fan tower.

While the above-described devices fulfill their respective and particular objects and requirements, they do not describe a fan assembly that includes at least two centrifugal fans that are collectively driven via a planetary gear system in connection with a single motor; wherein each centrifugal fan is partitioned within a respective portion of a housing, and which draws in air from one side of the portion of the housing and expelling air from an opposing side of the portion of the housing. In this regard, the fan assembly having multiple centrifugal fans in mechanical connection with a planetary gear system departs from the conventional concepts and designs of the prior art.

SUMMARY OF THE INVENTION

The fan assembly having multiple centrifugal fans in mechanical connection with a planetary gear system is a novel improvement to the field of fans, and which includes at least two centrifugal fans that are in mechanical connection with a single drive source. A planetary gear system connects the centrifugal fans to the single drive source such that all centrifugal fans work in concert. The assembly includes a housing that is constructed of a first portion positioned atop and able to rotate with respect to a second portion. The ability of the first portion to rotate with respect to the second portion enables the first portion where the centrifugal fans to rotate 360 degrees. The first portion includes partitions, which isolate each centrifugal fans from one another. Each centrifugal fan draws in air from a first side, and expels accelerated air through a second side. The housing is generally cylindrical and of an undefined length. The perimeter surface of the first portion includes a plurality of slotted openings that enable the air to enter and exit.

It is an object of the invention to provide a fan assembly that includes a plurality of centrifugal fans that are connected to a single drive source via a planetary gear system.

A further object of the invention is to provide the centrifugal fans that are in parallel relation with one another, and which are separated from one another via partitions that divide a first portion of the housing into individual compartments.

A further object of the invention is to provide a housing whereby the perimeter surface includes a plurality of slotted openings that enable air to enter and exit there through.

Another object of the invention is to include a second portion of the housing, which enables the first portion to rotate 360 degrees thereon, and which further distributes the accelerated air in wave motions.

Another object of the invention is to utilize a housing of an unspecified height, and being generally cylindrical in overall shape.

Another object of the invention is to include controls that enable the single drive source to operate independently of the rotational movement of the first portion with respect to the second portion.

These together with additional objects, features and advantages of the fan assembly having multiple centrifugal fans in mechanical connection with a planetary gear system will be readily apparent to those of ordinary skill in the art upon reading the following detailed description of presently preferred, but nonetheless illustrative, embodiments of the fan assembly having multiple centrifugal fans in mechanical connection with a planetary gear system when taken in conjunction with the accompanying drawings.

In this respect, before explaining the current embodiments of the fan assembly having multiple centrifugal fans in mechanical connection with a planetary gear system in detail, it is to be understood that the fan assembly having multiple centrifugal fans in mechanical connection with a planetary gear system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fan assembly having multiple centrifugal fans in mechanical connection with a planetary gear system.

It is therefore important that the claims be regarded as including such equivalent construction insofar as they do not depart from the spirit and scope of the fan assembly having multiple centrifugal fans in mechanical connection with a planetary gear system. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 4 illustrates a cross-sectional view along line 4-4 in FIG. 3, and depicting the arrangement of the centrifugal fans and rotational orientation with respect to the individual compartments of the first portion;

FIG. 5 illustrates another cross-sectional view along line 5-5 in FIG. 3, and detailing the planetary gear system forming mechanical connection between the single drive and the centrifugal fans; and FIG. 6 illustrates another cross-sectional view along line 6-6 in FIG. 3, and detailing the rotating female plug used to enable wired communication to the fan assembly.

DETAILED DESCRIPTION OF THE EMBODIMENT

Figure 1:
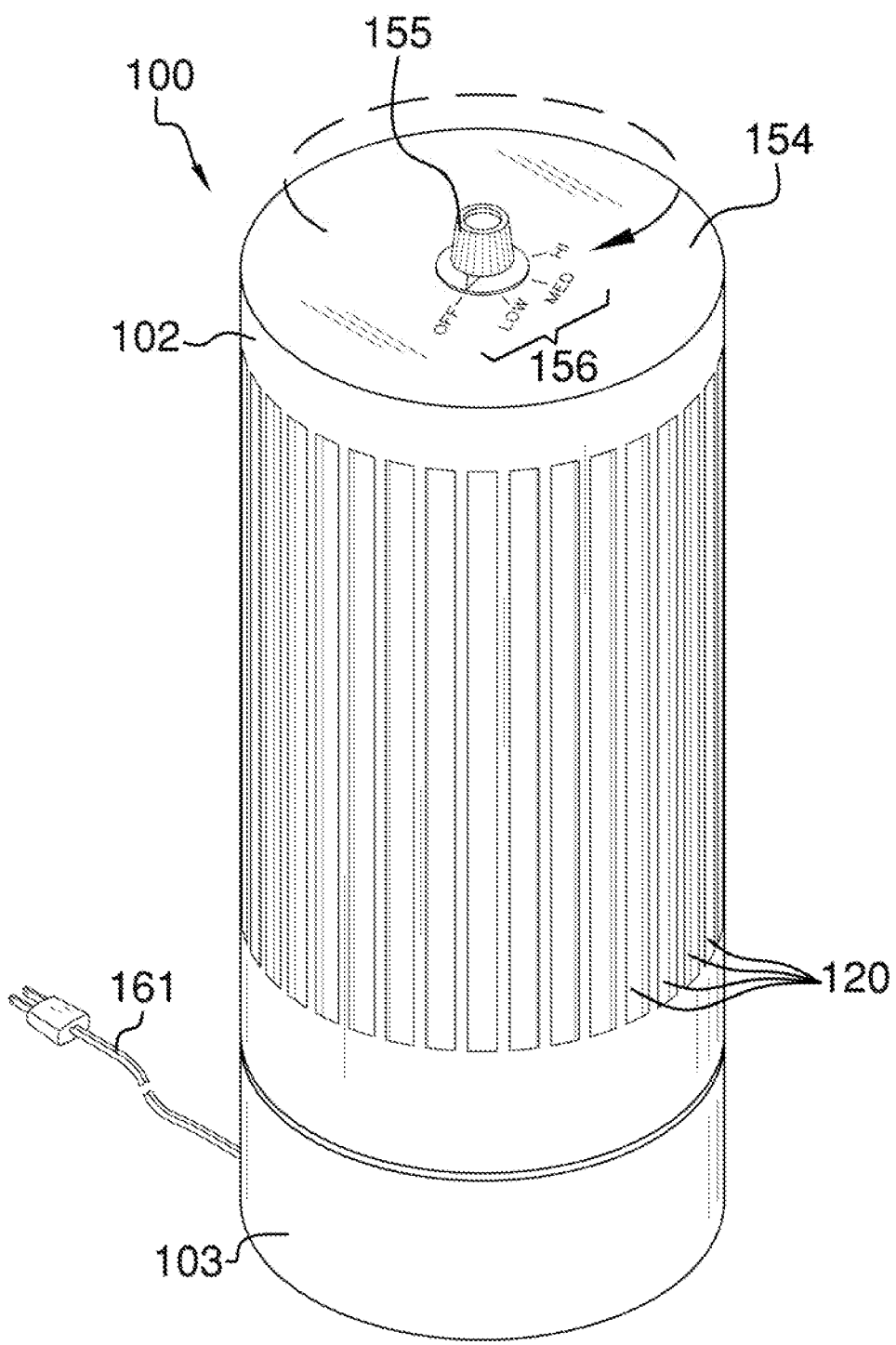
FIG. 1 illustrates a perspective view of the fan assembly by itself, and with a rotational arrow indicating movement of the first portion of the housing with respect to the second portion.
Figure 2:
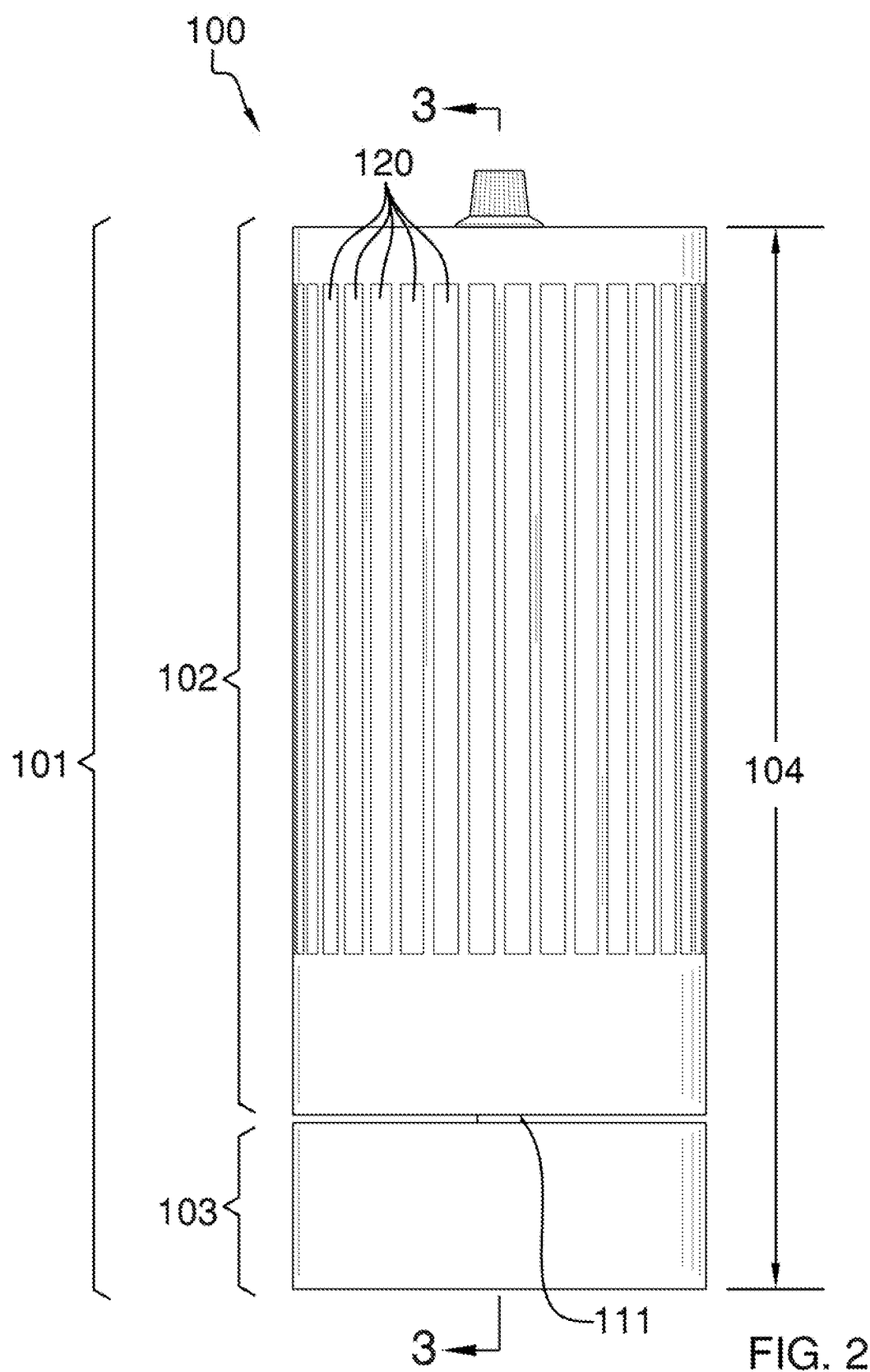
FIG. 2 illustrates a front view of the fan assembly, which further delineates the first portion from the second portion of the housing.
Figure 3:
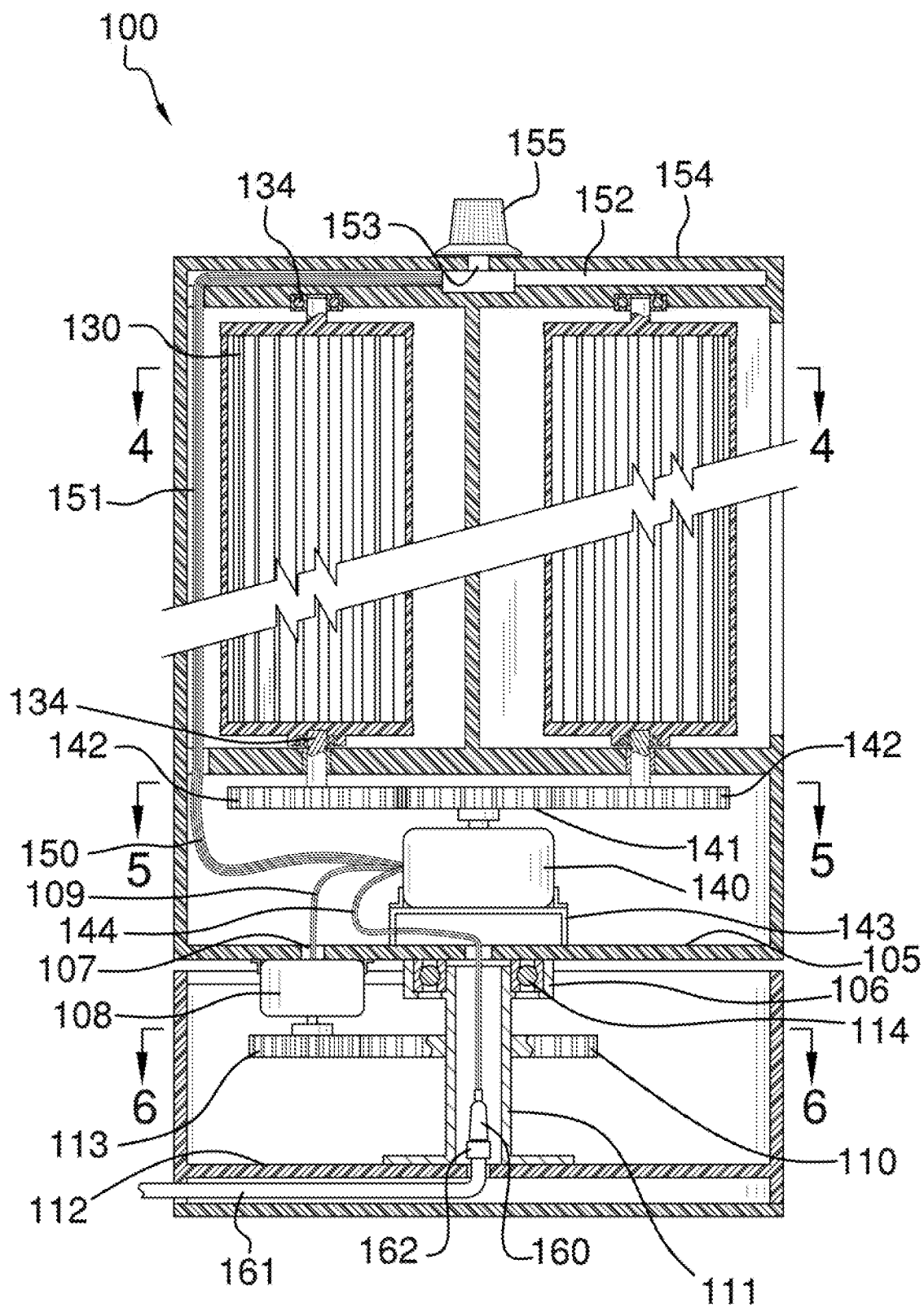
FIG. 3 illustrates a cross-sectional view of the fan assembly along line 3-3 in FIG. 2, and which further details the applicable components used in the function of the single drive and all applicable wiring.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A fan assembly 100 (hereinafter invention) includes a housing 101 consisting of a first portion 102 and a second portion 103. The housing 101 is of an unspecified height 104, and is generally cylindrical in shape. The first portion 102 and the second portion 103 are both of hollowed construction as is depicted in the FIGS.

The first portion 102 is able to rotate atop of and with respect to the second portion 103. Moreover, the first portion 102 is defined as having a first bottom surface 105 that includes a hole 106 centrally located thereon. The first bottom surface 103 has a secondary hole 107, which enables a first motor 108 to be in wired communication via a first wire 109. The first motor 108 is in mechanical communication with a second gear 110, which is located inside of the second portion 103. The first motor 108, when in use, rotates the first portion 102 with respect to the second portion 103 thereby enabling the first portion 102 to rotate a full 360 degrees while atop of the second portion 103.

The second gear 110 is secured to a second duct 111 that spans from a second bottom surface 112 to the first bottom surface 105. The first motor 108 includes a first drive gear 113 that communicates with the second gear 110 in order to rotate the first portion 102 with respect to the second portion 103. A bearing 114 shall be included in order to enable laminar rotational movement between the second duct 111 and the first bottom surface 105.

The invention 100 features a plurality of centrifugal fans 130. The centrifugal fans 130 are generally parallel with one another, and are all collectively housed within the first portion 102 of the housing 101. The first portion 102 includes a plurality of partitions 131, which divides the interior of the first portion 102 into a plurality of individual compartments 132. The individual compartments 132 actually house one of the plurality of centrifugal fans 130 therein. The centrifugal fans 130 are collectively in mechanical communication with a single centrifugal drive motor 140. The centrifugal drive motor 140 collectively rotates all centrifugal fans 130 in concert, which means that the centrifugal fans all rotate at the same speed and at the same time. The centrifugal drive motor 140 includes a solar gear 141 that rotates planetary gears 142. Each of the planetary gears 142 are rigidly affixed to one of the centrifugal fans 130 thereby enabling the single centrifugal drive motor 140 the means by which to drive all of the centrifugal fans 130.

The centrifugal drive motor 140 is mounted on a platform 143, which extends upwardly from the first bottom surface 105. The platform 143 enables a second wire 144 to extend from the centrifugal drive motor 140 through the central hole 106 of the first bottom surface 105, and extend downwardly through the first duct 111.

It shall be further denoted that the centrifugal fans 130 are each rotatably engaged inside of the first portion 102 via centrifugal bearings 134. Control wiring 150 extends from both the centrifugal drive motor 140 and the first motor 108. The control wiring 150 extends upwardly along an inner surface 151 of the first portion 102. The control wiring 150 traverses laterally within a cavity 152 before exiting through a control hole 153 provided on a top surface 154 of the first portion 102. The invention 100 includes a control knob 155 that is in wired connection via the control wiring 150 to the centrifugal drive motor 140 and the first motor 108.

Referring to FIG. 104, the first portion 102 includes a plurality of slots 120 along a perimeter surface, which enables air to enter and exit within each of the individual compartments 132. The slots 120 are generally parallel with one another. In FIG. 4, the centrifugal fans 130 rotate in concert (either all counterclockwise or all clockwise), and draw in ambient air 180 through one side of the individual compartment 132 whereby the respective centrifugal fan 130 accelerates the ambient air 180, which exits out of the individual compartment 132 as accelerated air 181.

Referring back to FIG. 3, the second wire 144 is responsible for transmitting electricity to all electrical components of the invention 100. Moreover, the second wire 144 extends down through the second duct 111 where a rotating female plug 160 is included and transmits electricity from an electrical plug 161. The rotating female plug 160 enables the second wire 144 to freely rotate with respect to the electrical plug 161, which enables free rotation of the first portion 102 with respect to the second portion 103 of the housing 101. The rotating female plug 160 connects with a rotating male plug 162 that is affixed to a distal end of the electrical plug 161.

The control knob 155 is located on the top surface 154 of the first portion 102, and when rotated shall adjust the speed of the centrifugal drive motor 140 and/or the first motor 108. Referring to FIG. 1, a plurality of settings 156 are included on the top surface 154 in order to designate the applicable setting of the control knob 155. The centrifugal drive motor 140 and the first motor 108 are electrical motors, and may further be characterized as variable speed electric motors, which are well known in the art of air fans.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A fan assembly comprising:
   a housing further defined with a first portion positioned atop of and able to rotate thereon and with respect to a second portion;
   wherein the first portion houses a plurality of centrifugal fans, which are isolated into individual compartments via a plurality of partitions, and whereby the centrifugal fans are in mechanical communication with a centrifugal drive motor via a planetary gear arrangement;
   wherein a first motor is affixed to a first bottom surface of the first portion, and which enables rotational movement to occur between the first portion and the second portion.

2. The fan assembly as described in claim 1 wherein the housing is of cylindrical construction, and of an undefined height.

3. The fan assembly as described in claim 2 wherein the first bottom surface includes a hole centrally located thereon, and a secondary hole; wherein the secondary hole enables the first motor to be in wired communication via a first wire.

4. The fan assembly as described in claim 3 wherein the first motor is in mechanical communication with a second gear, which is located inside of the second portion; wherein the second gear is secured to a second duct that spans from a second bottom surface to the first bottom surface.

5. The fan assembly as described in claim 4 wherein the first motor includes a first drive gear that communicates with the second gear in order to rotate the first portion with respect to the second portion; wherein a bearing is located between the second duct and the first bottom surface.

6. The fan assembly as described in claim 5 wherein the centrifugal fans are generally parallel with one another, and are all collectively housed within the first portion of the housing.

7. The fan assembly as described in claim 6 wherein the centrifugal fans are collectively in mechanical communication with a single centrifugal drive motor; wherein the centrifugal drive motor collectively rotates all centrifugal fans in concert; wherein the centrifugal drive motor includes a solar gear that rotates planetary gears; wherein each of the planetary gears is rigidly affixed to one of the centrifugal fans thereby enabling the single centrifugal drive motor by which to drive all of the centrifugal fans.

8. The fan assembly as described in claim 7 wherein the centrifugal drive motor is mounted on a platform, which extends upwardly from the first bottom surface; wherein the platform enables a second wire to extend from the centrifugal drive motor through the central hole of the first bottom surface, and extend downwardly through the first duct.

9. The fan assembly as described in claim 8 wherein control wiring extends from both the centrifugal drive motor and the first motor; wherein the control wiring extends upwardly along an inner surface of the first portion; wherein the control wiring traverses laterally within a cavity before exiting through a control hole provided on a top surface of the first portion.

10. The fan assembly as described in claim 9 wherein a control knob is in wired connection via the control wiring to the centrifugal drive motor and the first motor.

11. The fan assembly as described in claim 10 wherein the first portion includes a plurality of slots along a perimeter surface, which enables air to enter and exit within each of the individual compartments; wherein the slots are generally parallel with one another; wherein the centrifugal fans draw in ambient air through one side of the individual compartment whereby the respective centrifugal fan accelerates the ambient air, which exits out of the individual compartment as accelerated air.

12. The fan assembly as described in claim 11 wherein the second wire extends down through the second duct where a rotating female plug is included and transmits electricity from an electrical plug; wherein the rotating female plug enables the second wire to freely rotate with respect to the electrical plug, which enables free rotation of the first portion with respect to the second portion of the housing; wherein the rotating female plug connects with a rotating male plug that is affixed to a distal end of the electrical plug.

13. The fan assembly as described in claim 12 wherein the control knob is located on the top surface of the first portion, and when rotated shall adjust the speed of the centrifugal drive motor and/or the first motor.

14. A fan assembly comprising:
    a housing further defined with a first portion positioned atop of and able to rotate thereon and with respect to a second portion;
    wherein the first portion houses a plurality of centrifugal fans, which are isolated into individual compartments via a plurality of partitions, and whereby the centrifugal fans are in mechanical communication with a centrifugal drive motor via a planetary gear arrangement;
    wherein a first motor is affixed to a first bottom surface of the first portion, and which enables rotational movement to occur between the first portion and the second portion;
    wherein the first bottom surface includes a hole centrally located thereon, and a secondary hole; wherein the secondary hole enables the first motor to be in wired communication via a first wire;
    wherein the first motor is in mechanical communication with a second gear, which is located inside of the second portion; wherein the second gear is secured to a second duct that spans from a second bottom surface to the first bottom surface.

15. The fan assembly as described in claim 14 wherein the housing is of cylindrical construction, and of an undefined height; wherein the first motor includes a first drive gear that communicates with the second gear in order to rotate the first portion with respect to the second portion; wherein a bearing is located between the second duct and the first bottom surface; wherein the centrifugal fans are generally parallel with one another, and are all collectively housed within the first portion of the housing.

16. The fan assembly as described in claim 15 wherein the centrifugal fans are collectively in mechanical communication with a single centrifugal drive motor; wherein the centrifugal drive motor collectively rotates all centrifugal fans in concert; wherein the centrifugal drive motor includes a solar gear that rotates planetary gears; wherein each of the planetary gears is rigidly affixed to one of the centrifugal fans thereby enabling the single centrifugal drive motor by which to drive all of the centrifugal fans; wherein the centrifugal drive motor is mounted on a platform, which extends upwardly from the first bottom surface; wherein the platform enables a second wire to extend from the centrifugal drive motor through the central hole of the first bottom surface, and extend downwardly through the first duct.

17. The fan assembly as described in claim 16 wherein control wiring extends from both the centrifugal drive motor and the first motor; wherein the control wiring extends upwardly along an inner surface of the first portion; wherein the control wiring traverses laterally within a cavity before exiting through a control hole provided on a top surface of the first portion.

18. The fan assembly as described in claim 17 wherein a control knob is in wired connection via the control wiring to the centrifugal drive motor and the first motor; wherein the first portion includes a plurality of slots along a perimeter surface, which enables air to enter and exit within each of the individual compartments; wherein the slots are generally parallel with one another; wherein the centrifugal fans draw in ambient air through one side of the individual compartment whereby the respective centrifugal fan accelerates the ambient air, which exits out of the individual compartment as accelerated air.

19. The fan assembly as described in claim 18 wherein the second wire extends down through the second duct where a rotating female plug is included and transmits electricity from an electrical plug; wherein the rotating female plug enables the second wire to freely rotate with respect to the electrical plug, which enables free rotation of the first portion with respect to the second portion of the housing; wherein the rotating female plug connects with a rotating male plug that is affixed to a distal end of the electrical plug.

20. The fan assembly as described in claim 19 wherein the control knob is located on the top surface of the first portion, and when rotated shall adjust the speed of the centrifugal drive motor and/or the first motor.

* * * * *